Aug. 1, 1967  H. FRANKE ETAL  3,333,885
FOLDABLE SEAT ASSEMBLY
Filed Sept. 21, 1965

HERBERT FRANKE
CHARLES G. BROWN
ROBERT E. PAULSON
INVENTORS

BY John R. Faulkner
John J. Roethel
ATTORNEYS

# United States Patent Office 3,333,885
Patented Aug. 1, 1967

3,333,885
FOLDABLE SEAT ASSEMBLY
Herbert Franke, Detroit, Charles G. Brown, St. Clair Shores, and Robert E. Paulson, Northville, Mich., assignors to Ford Motor Company, Dearborn, Mich., a corporation of Delaware
Filed Sept. 21, 1965, Ser. No. 488,965
4 Claims. (Cl. 296—66)

ABSTRACT OF THE DISCLOSURE

This foldable seat assembly for automotive vehicles has the backrest portion and the seat portion linked to move simultaneously from an unfolded to a folded position. A torsion bar anchored to the vehicle floor acts directly on the seat portion and through the links on the backrest portion to urge the seat assembly toward its unfolded position. When the seat assembly is moving in the reverse direction and as it approaches its folded position, the linkage supporting the seat portion moves the seat portion backward slightly so the torsion bar enters into an over-center relationship with the assembly and thereby retains the assembly in the folded position without supplemental latches.

---

Figure 1:
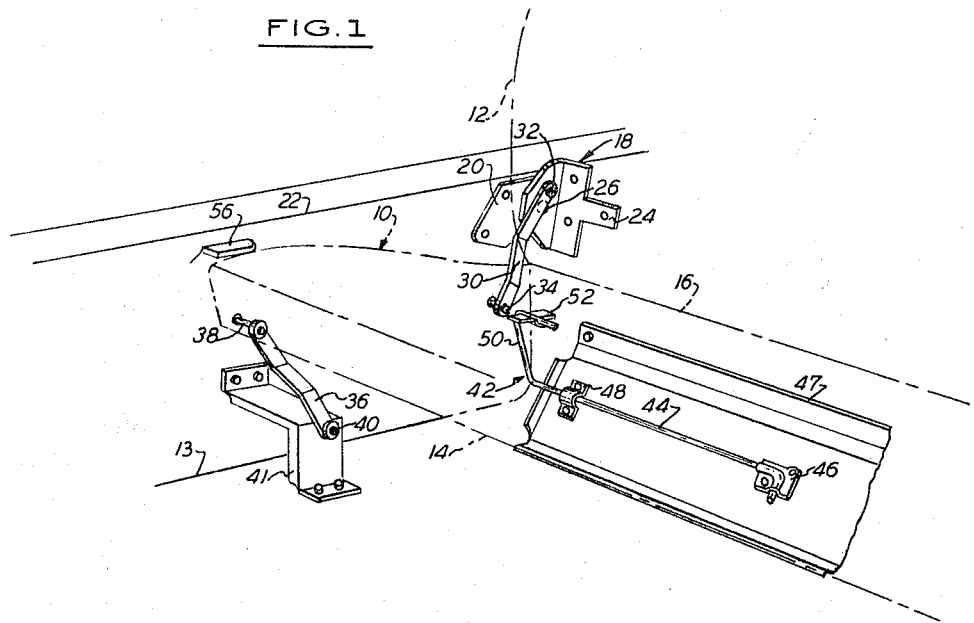

This invention concerns a foldable seat assembly in a multipurpose vehicle body such as a station wagon.

Seat assemblies which fold from a substantially upstanding position to a substantially horizontal position are used to convert rear compartments of station wagons from passenger-carrying to cargo-carrying arrangements. Most versatile of seat assemblies of this type is one in which the rear of the backrest portion of the seat serves as a floor when the seat assembly is in its cargo-carrying position. One of the earliest seat assemblies attaining this versatility comprised a backrest portion which could be swung forward to a substantially horizontal position overlying a stationary seat portion. Improvements to this seat assembly comprised a seat portion which was also forwardly swingable thereby providing for use of the space forward of the seat as part of the cargo-carrying area. For convenience, a seat assembly in which the seat portion movement was linked to movement of the backrest portion was provided. However, seat weight and friction in the supporting and connecting links made movement from the folded cargo-carrying position to the unfolded passenger-carrying position of linked seat and backrest portions difficult. In addition, separate means for retaining the seat assembly in its unfolded position against normal vehicle acceleration and deceleration forces were necessary.

This invention provides a foldable seat assembly having the seat portion and the backrest portion linked to move simultaneously which can be easily moved into an unfolded position where it resists normal vehicle acceleration and deceleration forces without the necessity of additional retaining means. In its preferred form, the foldable seat assembly of this invention comprises a seat portion having front and rear edges and a backrest portion. The backrest portion is pivotally supported for swinging movement about a fixed axis from a substantially upstanding position to a substantially horizontal position. First link means pivotally connected to the backrest portion and to the seat portion adjacent the rear edge and second link means pivotally connected to the floor and the seat portion adjacent the front edge support the seat portion for bodily shiftable movement from an elevated position to a lowered displaced position. Torsion means anchored to the floor and pivotally attached to the seat portion normally urge the latter toward its elevated position.

The first link means of this seat assembly transmits swinging movement of the backrest portion to the seat portion driving the latter against the resistance of the torsion means from its elevated position toward its lowered position when the backrest portion is swung from said upstanding position to said horizontal position. Consequently the torsion means aids movement toward the unfolded position when the backrest portion is lifted from its substantially horizontal position. In its horizontal position the backrest portion can overlie a part of the seat portion when the latter is in its lowered position if desired.

Figure 2:
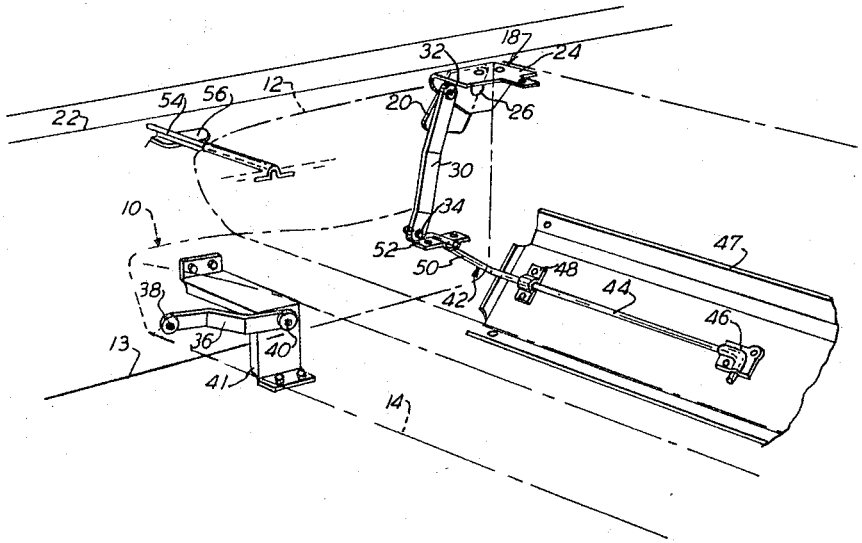

FIGURE 1 of the drawings is a perspective view of one side of the seat assembly of this invention in its upstanding position, the seat cushions being shown in phantom outline; and FIGURE 2 is a perspective of one side of the seat assembly in its substantially horizontal position. The side of the seat assembly not shown comprises pivot and link means similar to those shown in FIGURES 1 and 2.

Referring in detail to the drawings, seat portion 10 and backrest portion 12 are supported above vehicle floor 13. For the purpose of description, edge 14 is considered to be the front edge of seat portion 10 and edge 16 adjacent backrest portion 12 is the rear edge. It will be understood, however, that the seat assembly as a unit can be installed in the vehicle body facing forwardly or rearwardly. Backrest portion 12 is supported for pivotal movement relative to vehicle floor 13 by pivotal support means 18. Pivotal support means 18 comprises support bracket 20 attached to body side member 22 and a backrest portion bracket 24 mounted for pivotal support on pivot 26 carried on bracket 20. Bracket 24 is attached to backrest 12 by any well-known attaching means (not shown).

First link means 30 is pivotally attached to bracket 24 at upper pivot 32 located on bracket 24 above pivot 26. Link means 30 moves forward when backrest portion 12 is moved forward about pivot 26. Lower pivot 34 pivotally connects link means 30 to lower seat portion 10 adjacent rear edge 16. Link means 30 angles forwardly from upper pivot 32 to lower pivot 34 when backrest portion 12 is in its substantially upstanding position. Seat portion 10 is moved forward by link means 30 when backrest portion 12 is pivoted about pivot 26.

Second link means 36 is pivotally connected to seat portion 10 adjacent its front edge 14 by pivot 38. The other end of second link means 36 is pivotally connected by lower pivot 40 to bracket 41 fixedly attached to floor 13. With the seat assembly in its passenger-carrying position shown in FIGURE 1, second link means 36 and first link means 30 support seat portion 10 for bodily shiftable forward movement toward its lowered position when backrest portion 12 pivots forward about pivot 26.

Normally urging seat portion 10 toward its elevated position is a torsion means indicated generally at 42. Torsion means 42 comprises torsional member 44 anchored by anchor means 46 to anchor plate 47 and guided by guide means 48. Anchor plate 47 is fixedly attached to floor 13. Crank arm 50 of torsional member 44 is attached to seat portion 10 by bracket 52. Torsional member 44 is prestressed so that crank arm 50 urges seat portion 10 rearward toward its elevated position.

By arranging first link means 30 and second link means 36 so that seat portion 10 moves rearward during the latter portion of travel from its elevated position to its lowered position, torsion means 42 will impart an over-center relationship to the seat assembly thereby urging the seat assembly toward its folded position during this latter portion of travel and urging the seat assembly toward its unfolded position throughout the remaining portion of travel. With this arangement torsion means 42 retains the seat assembly in its folded position against ordinary vehicle vertical movements caused by uneven road surfaces and also retains the seat assembly in its unfolded position against ordinary vehicle acceleration and deceleration forces. In addition, the torsion means assists raising the seat assembly from its folded position to its unfolded position throughout that portion of the travel in which humanly exerting force on the seat assembly is most difficult.

Seat positioning means 54 is attached to the rear of the backrest portion 12 to engage boss 56 mounted on body side member 22, thereby positioning backrest portion 12 in a substantially horizontal position when the seat assembly is folded. Torsional member 44 is preferably positioned substantially parallel to floor 13 whereby excellent utilization of space is attained.

It will be understood that the invention is not to be limited to the exact construction shown and described, but that various changes and modifications may be made without departing from the spirit and scope of the invention, as defined in the appended claims.

What is claimed is:

1. A foldable seat assembly in a vehicle body having a floor,
    said seat assembly comprising a seat portion having front and rear edges and a backrest portion,
    means pivotally supporting the backrest portion for swinging movement about a fixed axis from a substantially upstanding position to a substantially horizontal position,
    first link means pivotally connected to the backrest portion and to the seat portion adjacent the rear edge,
    second link means pivotally connected to the floor and the seat portion adjacent the front edge,
    said first and second link means supporting the seat portion for bodily shiftable movement from an elevated position to a lowered displaced position,
    and a torsion bar anchored to the floor and pivotally attached to the seat portion normally urging the latter toward its elevated position, said torsion bar and its pivotal attachment to the seat portion lying within the space subtended by the seat portion,
    said first link means transmitting swinging movement of the backrest portion to the seat portion driving the latter against the resistance of the torsion bar from the elevated position toward the lowered position when the backrest portion is swung from said upstanding position to said horizontal position.

2. The seat assembly of claim 1 in which the torsion bar comprises an elongated torsional portion positioned substantially parallel to the floor,
    said torsional portion having one end anchored to the floor and having a crank arm on the other end,
    said crank arm being attached to the seat portion normally urging the latter toward its elevated position.

3. The seat assembly of claim 2 in which the first and second link means permit the seat portion to move backward during the latter portion of movement from its elevated position to its lowered position, said torsion bar then being in an overcenter relationship with the seat portion to urge the seat assembly toward its lowered position during said latter portion of movement.

4. The seat assembly of claim 3 which comprises means for positioning the backrest portion in its substantially horizontal position.

References Cited

UNITED STATES PATENTS

| | | | |
|---|---|---|---|
| 2,926,948 | 3/1960 | Koplin et al. | 296—66 |
| 2,926,949 | 3/1960 | Himka et al. | 296—66 |
| 2,949,331 | 8/1960 | Himka | 296—66 |
| 2,997,335 | 8/1961 | May | 296—66 |
| 3,113,801 | 12/1963 | Caley | 296—66 |

BENJAMIN HERSH, *Primary Examiner.*

MILTON BUCHLER, *Examiner.*

J. H. BRANNEN, *Assistant Examiner.*